(12) United States Patent
Mohamed

(10) Patent No.: US 11,405,471 B2
(45) Date of Patent: *Aug. 2, 2022

(54) USER-CONTROLLED SESSION MANAGER TO PROVIDE REMOTE DISABLING OF SESSION TOKENS

(71) Applicant: PayPal, Inc., San Jose, CA (US)

(72) Inventor: Riaz Ebrahim Mohamed, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,571

(22) Filed: Jun. 30, 2021

(65) Prior Publication Data

US 2021/0377347 A1 Dec. 2, 2021

Related U.S. Application Data

(63) Continuation of application No. 16/885,111, filed on May 27, 2020, now Pat. No. 11,076,001.

(51) Int. Cl.
| | |
|---|---|
| *H04L 67/143* | (2022.01) |
| *G06F 9/54* | (2006.01) |
| *H04L 47/80* | (2022.01) |
| *H04L 67/146* | (2022.01) |

(52) U.S. Cl.
CPC ............ *H04L 67/143* (2013.01); *G06F 9/547* (2013.01); *H04L 47/803* (2013.01); *H04L 67/146* (2013.01)

(58) Field of Classification Search
CPC ... H04L 67/143; H04L 47/803; H04L 67/146; G06F 9/547
See application file for complete search history.

(56) References Cited

U.S. PATENT DOCUMENTS

| | | | |
|---|---|---|---|
| 6,587,880 B1 | 7/2003 | Saigo et al. | |
| 10,462,124 B2 * | 10/2019 | Kong | H04L 63/083 |
| 2003/0101116 A1 | 5/2003 | Rosko et al. | |
| 2005/0060553 A1 | 3/2005 | Allen | |
| 2012/0058785 A1 | 3/2012 | Clark et al. | |

(Continued)

OTHER PUBLICATIONS

LINGAPPA. "What is session hijacking and how you can stop it." feeCodeCamp. May 24, 2018 Retrieved on Jul. 19, 2021 from: <https://www.freecodecamp.org/news/session-hijacking-and-how-to-stop-it-711e3683d1ac/>.

*Primary Examiner* — Arvin Eskandarnia
*Assistant Examiner* — Chhian (Amy) Ling
(74) *Attorney, Agent, or Firm* — Haynes and Boone, LLP

(57) ABSTRACT

There are provided systems and methods for a user-controlled session manager to provide remote disabling of session tokens. An online service provider, such as a user-controlled session manager, may provide service to manage sessions between user's devices and other online service provider platforms, such as login and use sessions that exchange messages and data. The session manager may receive hashed values of session IDs from the service providers hosting the sessions, which may be used to securely identify the sessions without compromising the session IDs to malicious parties. The session manager may provide a functionality to allow the user to view session statuses, as well as change their statuses to indicate that the sessions can be terminated. The session manager may update the status so that when the service provider pings the session manager for the status, the session's status is updated to be inactive.

20 Claims, 6 Drawing Sheets

(56) References Cited

U.S. PATENT DOCUMENTS

| | | |
|---|---|---|
| 2012/0226813 A1 | 9/2012 | Ragusa et al. |
| 2015/0379293 A1 | 12/2015 | Wang et al. |
| 2016/0140631 A1 | 5/2016 | Scrivner |
| 2017/0149835 A1 | 5/2017 | Mitevski |
| 2020/0220853 A1 | 7/2020 | Xu et al. |

* cited by examiner

Mappings 1000

Account A 1060
Account Identifier 1062

| User 1002 | Service 1010 | Session ID Hash 1020 | Timestamp 1030 | Status 1040 | Action 1050 |
|---|---|---|---|---|---|
| Bob 1004 | Example app.com 1012 | 12345 - Hash - 67 1022 | 3:30 1/1 1032 | Conf. Terminated 1042 | None 1052 |
| Bob 1006 | Website A.com 1014 | 54321 - Hash - 76 1024 | 12:30 1/2 1034 | Active 1044 | Terminate 1054 |
| Bob 1008 | Website B.com 1016 | 67890 - Hash - 12 1026 | 1:00 1/2 1036 | Inactive (Unconf.) 1046 | Status Query 1056 |

FIG. 2A

USER-CONTROLLED SESSION MANAGER TO PROVIDE REMOTE DISABLING OF SESSION TOKENS

CROSS REFERENCE TO RELATED APPLICATIONS

This application is a Continuation of U.S. patent application Ser. No. 16/885,111, filed May 27, 2020, now U.S. Pat. No. 11,076,001, which is incorporated by reference in its entirety.

TECHNICAL FIELD

The present application generally relates to online data security, and more particularly to providing a user-controlled session manager used to invalidate session identifiers after ending of an online session between a user and an online service provider.

BACKGROUND

Online service providers, such as electronic transaction processors, social networking, microblogging, media sharing, messaging, business and consumer platforms, and the like, may each establish a session between a computing device for a user and a service, system, or another online platform for the service provider. A session may be provided to allows communications and interactivity between the user's computing device and the system provider's systems. For example, a login and communication session may allow for a user to access an account and utilize account services, including electronic transaction processing, messaging or social networking, and the like. When a user ends a session, such as by logging out from their account, service providers may be required to maintain security protocols to invalidate a correspond session identifier (ID), token, and/or cookie. This prevents session hijacking, account takeover, and other malicious or fraudulent computing attacks. For example, if a service provider does not follow adequate security practices for session management to invalidate a session ID, the session may remain active, which increases risk of security loopholes and attacks. Moreover, the end user does not have transparency that the session cookie remains on the server and control over ending the session, which prevents the user from taking active security steps.

BRIEF DESCRIPTION OF THE DRAWINGS

FIG. 2A is an exemplary user interface displaying a mapping between hashed session identifiers, service providers, and sessions between users and the service providers for use in terminating a session, according to an embodiment;

Figure 1:
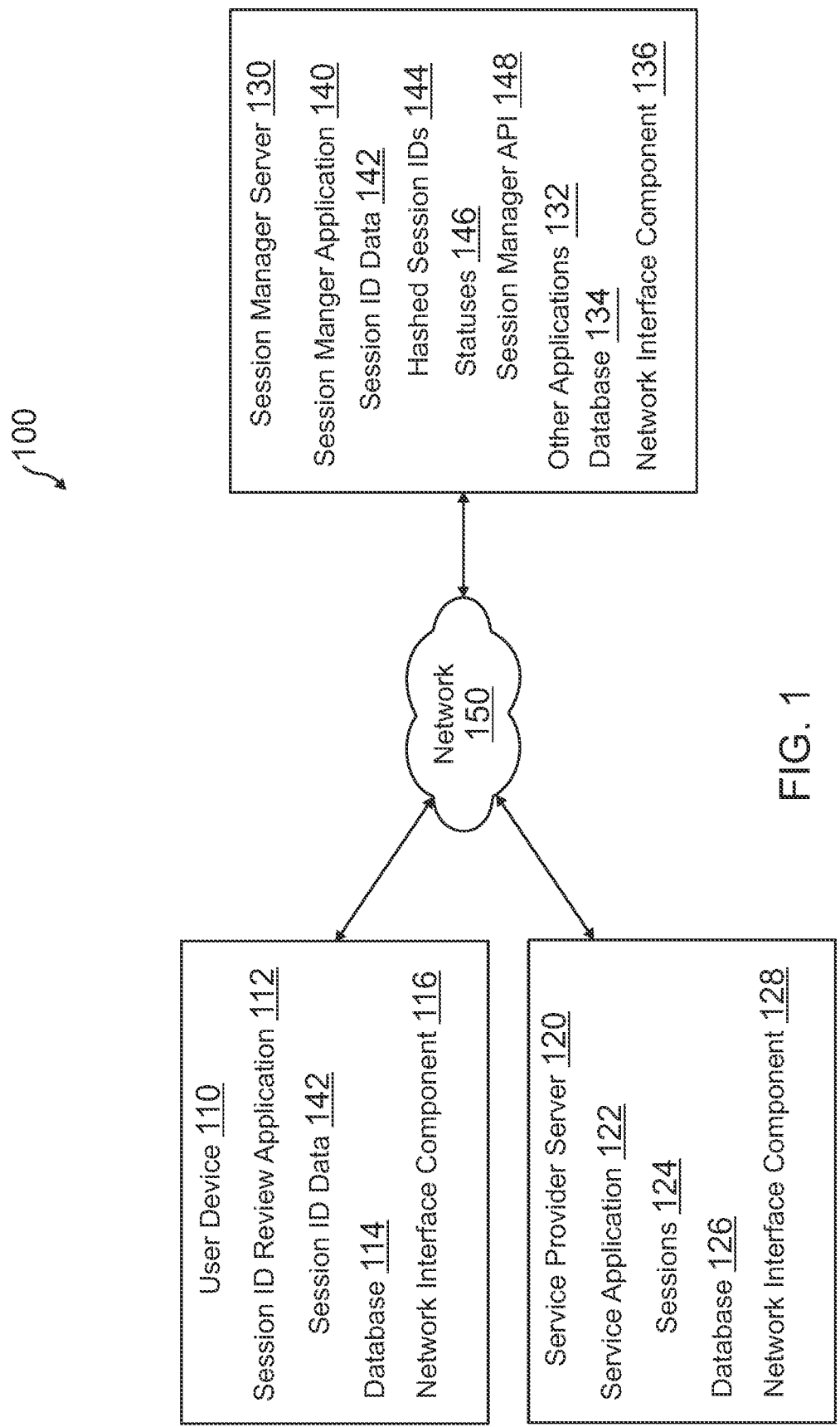
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a user-controlled session manager to provide remote disabling of session tokens. Systems suitable for practicing methods of the present disclosure are also provided.

A service provider may include or correspond to a user-controlled session manager (UCSM) that may provide services for users to control sessions and session identifiers (IDs) or cookies with other online service providers and platforms. The UCSM may provide a server, system, and/or other online platform that may receive session IDs when a session is established between the user and another service provider, such as when the user logs in to an account with the service provider or otherwise establishes a login, authentication, and/or communication session between the user's device and the service provider. The session ID received by the UCSM may correspond to a hash of the session ID with the service provider so that the session ID is not compromised when transmitted to the UCSM and/or stored and provided by the UCSM with a session manager account for the user with the UCSM. The user may utilize their session manager account to view hashed session IDs, as well as their corresponding service providers and sessions, session status (e.g., activate, inactive, terminated, unresponsive, etc.). Through the UCSM and corresponding session manager account, the user may elect to terminate and end a particular session, which may update the session's status to terminated or inactive. Thereafter, when the service provider that created and/or hosted the session pings the UCSM for a status of the session using the hashed session ID, the UCSM may provide a terminated and/or inactive session status to notify and/or cause the service provider to end the session and terminate, mark invalid, or delete the corresponding session ID with the service provider.

For example, different online service providers may provide account services, for example, to perform electronic transaction processing to entities, such as consumers and merchants that may wish to process transactions and payments. The service providers may also or instead provide social networking, microblogging, media sharing, messaging, email, or other business and consumer platforms that allow users to establish use sessions. In some embodiments, the user may establish an account and/or utilize transaction processing services, for example, by providing account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial information, including payment card (e.g., credit/debit card) information, bank account information, gift card information, benefits/incentives, and/ or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In this regard, the user may perform a login or an authentication that establishes a session with the service provider. Login and authentication may refer to different types of user and/or account authentications or verifications that may require a secret authentication credential (e.g., password, PIN, etc.), including verifying a user, performing account authentication to access an account, and/or using the account with a service or product of the service provider. This may create a session, which may correspond to an information interchange between two or more computing devices, servers, and/or systems. Session are therefore temporary and interactive by allowing messaging and information exchange between the devices in at least one direction and may be established at a certain point in time and ended at another time (e.g., based on creation and/or termination timestamps). The sessions may be established for communication or data transport in one or more abstraction layers, such as the application layer, web server layer, session layer, or transport layer.

Further, a UCSM may provide an account, where a user may login and view the account, including mappings of hashed session IDs to session statuses, creation or termination timestamps, corresponding service providers and/or service provider sessions, available actions (e.g., terminate the session), and the like. When first creating a UCSM account, a user may be provided with a UCSM user identifier, which may uniquely identify the user and the user's account to the UCSM. The UCSM user identifier may allow service providers to transmit a hashed session ID for a session (and corresponding session ID, token, or cookie) established by the user's use of the service provider. The user may utilize this UCSM user identifier to register with each service provider so that each service provider may transmit hashed session identifiers to the UCSM with the user's UCSM user identifier, which allows the UCSM to then associate and store the hashed session ID to the user's account. The service providers may therefore be integrated and enrolled with use of the UCSM for managing and controlling sessions and session IDs. Alternatively, the UCSM may prompt the user to provide information or select service providers that the user has an account with, and the UCSM may then communicate with the service provider to onboard the user's account with the service provider with the UCSM user identifier. Thus, the UCSM provide may provide the UCSM user identifier to the service provider directly, for example, where the user is already registered with a service provider. In some embodiments, this may require a fee or subscription-based service by the service providers and may further provide different regulatory compliance and/or compliance notifications, ratings, and the like to identify that the service provider utilizes the UCSM for session management and therefore provides more security features.

Thereafter, when a user establishes a session with a service provider, the service provider may create and generate a session ID, token, and/or cookie. The session ID may be stored as a cookie to the user's device to allow for the interactivity and messaging. When the session ends, security practices require that the session ID is invalidated both on the user's device and the service provider-side so that the session ID may not be hijacked, and the session does not remain for use by malicious actors. However, although the user's device may invalidate and/or delete the session ID, the service provider may not adhere to adequate practices to invalidate.

To address this, in various embodiments, when the session is created, the service provider may create a hash of the session ID and utilize the user's UCSM user identifier to transmit the hashed session ID to the UCSM. The communication or message including the hashed session ID and UCSM user identifier may be provided by an application programming interface (API) call to an exposed API of the UCSM. Further, the API call may include additional information and/or may indicate such information, such as a creation timestamp of the corresponding session, an active status (or other corresponding status), a length of activity of the session, and/or an identifier, web address, website, name, service, or other information for the service provider. Although the service provider may hash the session ID, for example, using a hashing algorithm or function of the service provider, in some embodiments, the UCSM API may also or instead provide the hashing capabilities to hash the session ID from the service provider.

Thereafter, the UCSM may store the hashed session ID with the user's account with the UCSM (e.g., using or based on the UCSM user identifier received with the hashed session ID). The hashed session ID may be stored in the account with an activity status, such as an active session status for a recently created session. Further, the account may include a mapping of the hashed session ID to the session status, the session creation and/or termination timestamp, a name or identifier of the service provider hosting the session, any other session information, and/or an action that may be taken with respect to the session (e.g., terminate the session, ping the service provider for a session status, or other action). The service provider may also maintain a mapping of the session ID and the hashed session ID, or the service provider may determine the hashed session ID using the hashing algorithm or function. Thus, the service provider may be capable of determining the hashed session ID to communicate with the service provider and determining a session status using the hashing function. Thereafter, when the user accesses their UCSM account, the UCSM may provide an interface that includes one or more established sessions and their corresponding session status, which enables a user to view the current statuses of any established sessions and corresponding hashed session IDs and service providers. This may be viewed through a device-side application or a web application (e.g., from a website of the service provider). One or more application interfaces may display the corresponding mappings and options to change the session status through the user's device.

The service provider may then continuously and/or periodically ping or query the UCSM through one or more additional API calls to determine the status of the session with the UCSM. The service provider may query the UCSM for the status using the hashed session ID, which may be stored by the service provider with a mapping to the session ID and/or recalculated and generated using the hashing algorithm. The service provider may determine a time interval or time period, such as twice a minute, every minute, five minutes, or other periodic amount of time, to ping the UCSM for an update and/or change to the session status. Further, in some embodiments, the UCSM may also ping the service provider using the hashed session ID for a status of the session, including whether the session has been terminated and/or the session ID invalidated or deleted. The service provider may use the hashed session ID to perform any lookups through hashed session IDs to session ID mappings and/or hashing algorithm. Thus, both the service provider and the UCSM may perform read, write, and/or get calls to determine a status of the session using the hashed session ID and corresponding mappings.

The user may utilize their account to change a status of the session through the hashed session ID. For example, an option may be provided through the user's account and/or account interfaces that allow the user to update or change the session status from active to terminated, inactive, or end. This allows the user to change the session status through an application or website of the UCSM on the user's device, as well as view different sessions created by the user with different service providers. When using the option or feature to change the session status, the UCSM may update the session status to terminated or inactive with the mapping of the session and hashed session ID for the user's account. Thus, the user's UCSM account reflects that the session has been terminated and the session ID should be marked invalid, inactive, and/or deleted.

Thereafter, when the service provider pings the UCSM for a status of the session using the hashed session ID and UCSM user identifier for the user's account, the UCSM may respond that the session is inactive or terminated. This may request and/or inform the service provider to deactivate and/or delete the session ID with the service provider and/or user's device so that the session is ended. The UCSM may respond to an API call from the service provider with the terminated status and update the service provider to end the session. In some embodiments, the UCSM may receive a confirmation from the service provider that the session has been terminated when the UCSM responds to the service provider. The UCSM may also automatically update the interface displaying the session status to the user with a "confirmed termination" status for the session if the UCSM receives the confirmation of the termination. In some embodiments, the UCSM may automatically change the session status for a particular session, such as based on a risk, trust, or confidence score in the session management security protocols of the service provider and/or after an amount of time to automatically timeout sessions with service providers that the user has set for the UCSM account. Further, in some embodiments, the UCSM may also transmit the request to terminate the session through an API call to the service provider when the status is changed or at time other time (e.g., based on a timeout period for sessions set by the user' with their UCSM account).

When the UCSM responds to the service provider to end the session based on a change to the session status with the user's UCSM account, the service provider may then delete, render inactive, or otherwise invalidate the corresponding session ID, token, or cookie from the service provider's session processes, session management operations, and/or databases. The service provider may also invalidate or request deletion of a device-side token or cookie for the session on a computing device of the user. Thus, the service provider may require creation and generation of a new session ID, token, or cookie to further establish another session. In some embodiments, prior to the user terminating a session with a service provider using the UCSM (e.g., by updating the session's status), the UCSM may notify the user of the sessions active status, such as if the session has remained open and valid with the UCSM for a period of time. In this regard, when notifying the user of the active session status, the UCSM may utilize a confidence score or trust rating in the service provider's past history and/or security protocols for ending sessions and invalidating session IDs. For example, if the service provider previously has not properly ended sessions and/or session hijacking and fraud has been detected, the UCSM may ping or notify the user through a device-side application, text message, email, or other communication, where the alert may indicate to the user that the session is still potentially active. However, where the service provider has a high confidence rating (e.g., over a threshold level), the UCSM may not ping the user as the UCSM is more confident that any active sessions have been properly ended. For example, if the service provider has a low confidence score (e.g., below a 50% rating in ending previous sessions, receiving a D or an F grade in session termination protocols, etc.), the UCSM may send a message (e.g., a text message, in-app message, push message, etc.) to the user's device that reminds the user to manually terminate the session via the UCSM. However, where the service provider has a high confidence score (e.g., above a 90% or an A rating), the UCSM may not message the user's device and may instead display and/or update the session status only when requested by the user via the user's device.

In various embodiments, the UCSM may implement additional security measures through the UCSM account, APIs, and additional operations. For example, the UCSM may implement a process to prevent additional sessions with the same service provider from being established for a period of time after a session is ended, such as a few minutes, and hour, etc. This may prevent other users that fraudulently acquire the user's credentials and/or session ID from creating a new session and performing an account takeover. Thus, if the UCSM receives another hashed session ID from the same service provider for the same UCSM user ID and account, the UCSM may immediately mark as invalid and/or terminate to end the session. In further embodiments, the UCSM may implement a timeout period to automatically change or update a session's status for a hashed session ID to terminated or inactive after a time period.

The UCSM may also only allow sessions to be active and/or established during certain time periods (e.g., during the day and not between 11 PM and 7 AM when a user is asleep). If a session is established and a hashed session ID received by the service provider during this time, the UCSM may then update the session status with the user's UCSM account to inactive. In some embodiments, the UCSM may also ping or notify the user each time a hashed session ID is received from a service provider, or particular service providers (e.g., those having a confidence rating under a threshold), through a device application and/or communication to the user. This may therefore alert the user of any sessions if an account takeover occurs. Further, by notifying the user of created sessions based on receiving hashed session IDs, the UCSM may implement a two-factor authentication process where the user may be required to approve and validate any session status for a received hashed session ID. For example, if the user does not validate or approve of the session status, the UCSM may automatically change the session status for the hashed session ID to inactive or terminated.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments.

Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a user device 110, a service provider server 120, and a session manager server 130 in communication over a network 150. User device 110 may be utilized by a user to establish a use session, such as a login and/or authentication, between user device 110 and service provider server 120. The session may include a session ID, where a hash of that value is provided to session manager server 130 for session management. Session manager server 130 may include one or more operations to provide options to end sessions, which may be updated and conveyed to service provider server 120 to end a session by a user an enforce session management protocols.

User device 110, service provider server 120, and session manager server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 120 and/or session manager server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

User device 110 of FIG. 1 contains a session ID review application 112, a database 114, and a network interface component 116. Session ID review application 112 may correspond to executable processes, procedures, and/or applications with associated hardware. In other embodiments, user device 110 may include additional or different modules having specialized hardware and/or software as required.

Session ID review application 112 may correspond to one or more processes to execute software modules and associated components of user device 110 to provide features, services, and other operations for reviewing sessions and hashes of session IDs for sessions between user device 110, service provider server 120, and/or other service providers. In this regard, session ID review application 112 may correspond to specialized hardware and/or software utilized by a user of user device 110 that may be used to establish and access an account used for session management of sessions established by the user associated with user device 110 and one or more service providers, including service provider server 120. Session ID review application 112 may access the session management account with session manager server 130 and may view a mapping having a hashed session ID and a session status (e.g., active, terminated, inactive, unresponsive, etc.). The mapping within the account may therefore include session ID data 142, which may include the hashed session ID and session status. Further, session ID data 142 may include a timestamp, a service provider identifier or other identification data, and other information about a session. Using session ID data 142, user device 110 may be used to display an interface having an option or process to request termination of a session by updating the session's status with session manager server 130 to terminated or inactive. Session ID review application 112 may also be used to display notifications and alerts to the user of user device 110.

User device 110 may further include database 114 stored on a transitory and/or non-transitory memory of user device 110, which may store various applications and data and be utilized during execution of various modules of user device 110. Database 114 may include, for example, identifiers such as operating system registry entries, cookies associated with session ID review application 112 and/or other applications 112, identifiers associated with hardware of user device 110, or other appropriate identifiers, such as identifiers used for payment/user/device authentication or identification, which may be communicated as identifying the user/user device 110 to service provider server 120 and/or session manager server 130, for example, to access an account and/or establish a session. Moreover, database 114 may include session ID data 142 that may be used and presented through session ID review application 112.

User device 110 includes at least one network interface component 116 adapted to communicate with session manager server 130. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may create, maintain, and terminate sessions for message and communications with user device 110, such as for a use, login, and/or authentication session between user device 110 and service provider server 120. In this regard, service provider server 120 includes one or more processing applications which may be configured to interact with user device 110 to exchange data. Thus, service provider server 120 may be maintained by or include another type of service provider that may provide services to users Service provider server 120 of FIG. 1 includes a service application 122, a database 126, and a network interface component 128. Service application 122 may correspond to executable processes, procedures, and/or applications with associated hardware. In other embodiments, service provider server 120 may include additional or different modules having specialized hardware and/or software as required.

Service application 122 may correspond to one or more processes to execute modules and associated specialized hardware of service provider server 120 to perform a service to end users of service provider server 120, such as process a transaction between users or entities and/or otherwise use an account. In this regard, service application 122 may correspond to specialized hardware and/or software used by a user associated with user device 110 to perform one or more services, such as messaging, social networking, media posting or sharing, microblogging, data browsing and searching, online shopping, and other services available through service provider server 120. Thus, service application 122 may be used to establish sessions 124 between user device 110 and service provider server 120, such as to exchange data, communications, and/or messages and allow users to use services and other operations and data available from service application 122. When a session is established, service application 122 may generate session IDs, tokens, or cookies for sessions 124, which may be stored in database 126 and device-side for user device 110. Further, when a session is ended, the session IDs for sessions 124 may be required to be invalidated and/or deleted to end a session and prevent other malicious users from hijacking the sessions. Service application 122 may hash the session IDs for sessions 124 and store those hashed session IDs to session manager server 124 using an identifier for the user's account with session manager server 130. Thus, service application 122 may include a hashing algorithm or function to hash session identifiers. Further, when the session is active and/or after the session is ended, service application 122 may ping session manager server 130 to determine a status of each session and may terminate the session and invalidate the session IDs for sessions 124 using the hashed session IDs when a session status with session manager server 130 is no longer active.

Additionally, service provider server 120 includes database 126. Database 126 may store various identifiers associated with user device 110. Database 126 may also store account data, including payment instruments and authentication credentials, as well as transaction processing histories and data for processed transactions. Database 126 may also store other account information including session IDs for sessions 124.

In various embodiments, service provider server 120 includes at least one network interface component 128 adapted to communicate user device 110 and session manager server 130 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Session manager server 130 may be maintained, for example, by an online service provider, which may provide services to manage sessions through hashed session IDs received from service provider server 120 or other service providers and corresponding statuses for the sessions. In this regard, session manager server 130 includes one or more processing applications which may be configured to interact with user device 110, service provider server 120, and/or other service providers to manage session activities and session IDs. In one example, session manager server 130 may be provided by PAYPAL®, Inc. of San Jose, Calif., USA. However, in other embodiments, session manager server 130 may be maintained by or include another type of service provider.

Session manager server 130 of FIG. 1 includes a session manager application 140, other applications 132, a database 134, and a network interface component 136. Session manager application 140 and other applications 132 may correspond to executable processes, procedures, and/or applications with associated hardware. In other embodiments, session manager server 130 may include additional or different modules having specialized hardware and/or software as required.

Session manager application 140 may correspond to one or more processes to execute modules and associated specialized hardware of session manager server 130 to provide a framework to allow users to manage sessions with other service providers, including invalidating sessions through session manager application 140, which updates a session status and allows service provider server 120 and/or another service provider to query session manager application 140 on a session status. In this regard, session manager application 140 may correspond to specialized hardware and/or software used by a user associated with user device 110 to provide one or more user interfaces to manage session ID data 142. Session manager application 140 may allow the user to first establish a session manager account to manage sessions, and provide a session manager account identifier, number, or other identification data. This account identifier for the session manager account may be distributed by the user and/or session manager server 130 to other service providers, including service provider server 120, to identify the user's account. Thereafter, when the particular service provider generates a session, a hash of the session identifier may be received by session manager application 140. This hash may correspond to hashed session IDs 144 for the user's account corresponding to session ID data 142, which may be stored and utilized by session manager application 140.

Session manager application 140 further provides statuses 146 for each of hashed session IDs 142. Statuses 146 may correspond to active or inactive/terminated for particular sessions. User device 110 may be used to update statuses 146 to change one of statuses 146 to inactive or terminated when a user wishes to end a particular session associated with one of hashed session IDs 144. Thereafter, when service provider server 120 or another service provider pings or queries session manager application 140 for a status of the corresponding one of hashed session IDs 144, statuses 146 may be used to provide a reply designating the session as terminated, which may cause the service provider to end the session. A session manager API 148 may be exposed to user device 110 and service provider server 120, which may be used to manage sessions through receiving API calls corresponding to hashed session IDs 144 and pings or queries for statuses 146. Session manager API 148 may be used by session manager application 140 to receive the API calls and respond to the API calls to manage session identifiers.

In various embodiments, session manager server 130 includes other applications 132 as may be desired in particular embodiments to provide features to session manager server 130. For example, other applications 132 may include security applications for implementing server-side security features, programmatic client applications for interfacing with appropriate application programming interfaces (APIs) over network 140, or other types of applications. Other applications 132 may contain software programs, executable by a processor, including a graphical user interface (GUI), configured to provide an interface to the user when accessing session manager server 130, where the user or other users may interact with the GUI to more easily view and communicate information. In various embodiments, other applications 132 may include additional connection and/or communication applications, which may be utilized to communicate information to over network 150.

Additionally, session manager server 130 includes database 134. Database 134 may store various identifiers associated with user device 110. Database 134 may also store account data, including payment instruments and authentication credentials, as well as other account data for session manager, such as session ID data 142. Database 134 may store financial information and tokenization data. Database 134 may further store information for use in terminating sessions, such as session status changes and other information for session ID data 142 and/or session data received from service provider server 120.

In various embodiments, session manager server 130 includes at least one network interface component 136 adapted to communicate user device 110, service provider server 120, and/or other service providers over network 150. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is an exemplary user interface 200a displaying a mapping between hashed session identifiers, service providers, and sessions between users and the service providers for use in terminating a session, according to an embodiment. In user interface 200a, mappings 1000 are shown that may be presented on a computing device, such as user device 110 in system 100 of FIG. 1, by a UCSM, such as session manager server 130 in system 100. In this regard, user interface 200a may be presented to show a user active, inactive, and/or terminated sessions, as well as allow the user to terminate a session in a user-controlled manner from a device-side application and/or web application displaying user interface 200a.

In user interface 200a, mappings 1000 may be stored and provided by the UCSM through user interface 200a based on received hashed session IDs, tokens, or cookies from different service providers. Similarly, a service provider, such as service provider server 120 in system 100, may maintain a mapping of a plain text or un-hashed session ID to a session, user/account identifier, timestamp, session status, and/or hashed session ID (although the hashed session ID may also be recalculated using the hashing algorithm of the service provider). For mappings 1000, a user 1002 is shown that corresponds to a user or account identifier for a particular session, shown as Bob 1004, Bob 1006, and Bob 1008 for mappings 1000. However, in other embodiments, different names, account identifiers, and the like may be associated with user 1002 for a UCSM user account corresponding to account A 1060 in mappings 1000, such as based on other users and/or account names associated with account A 1060. The ID for account A 1060 may be shown through account identifier 1062, which may be used to provide service providers with account identifier 1062 to thereby link a service provider account to the UCSM account corresponding to mappings 1000.

For the session corresponding to Bob 1004, a service 1010 is shown, which corresponds to a particular service provider that is providing and/or hosting the session. First service 1012 for the session is shown as "exampleapp.com," which may correspond to an online website application that provides the session for Bob 1004 (e.g., based on a login and/or authentication with the website or web application). For first service 1012, a session ID hash 1020 may be received from first service 1012 and mapped to Bob 1004 and first service 1012 in mappings 1000. A first hash 1022 is shown for session ID hash 1020 of "12345-hash-67." First hash 1022 uniquely identifies the session and session ID with first service 1012 so that Bob 1004 knowns that a session exists between his device and first service 1012 when viewing mappings 1000 through account A 1060.

Additionally, for the session corresponding to Bob 1004, additional information may be provided, including a timestamp 1030, a status 1040, and an action 1050. Timestamp 1030 may show a creation or start time to the session, or a time of receipt of first hash 1022 by the UCSM. In mappings 1000, first timestamp 1032 for the session corresponding to Bob 1004 is shown as 3:30 on 1/1. Thus, Bob 1004 is able to ascertain when the session was initiated to determine whether he has ended the session, or the session should be ended. First status 1042 for the session corresponding to Bob 1004 is shown as "Confirmed Terminated," thereby informing Bob 1004 that the session has ended and the UCSM has received confirmation of the session termination from the service provider (e.g., in response to the UCSM requesting termination when Bob 1004 corresponding to account A 1060 has selected a termination option and interface element to terminate the corresponding session). Thus, under action 1050 where Bob 1004 may execute an action with regard to the session (e.g., to end or terminate the session), first action 1052 is shown as "None," denoting that no action may be taken as the session has already ended and the service provider has confirmed ending of the session and termination, deleting, or rending inactive the corresponding session ID. Under action 1050, selectable interface options may be shown and/or updated based on session statuses so that Bob 1004 may view, select, and request these options with regard to the sessions shown in mappings 1000. For example, action 1050 may include an interface element, such as a button, drop down menu, or the like, that allows Bob 1004 to request execution of a process to terminate a session and/or check session termination status with the corresponding service provider for a session.

For another session corresponding to Bob 1006, a second service 1014 under service 1010 shows a different service provider of "websiteA.com," which has a different session corresponding to Bob 1006. This different session is identified using second hash 1024 for session ID hash 1020, appearing as "54321-hash-76." Second hash 1024 therefore uniquely identifies this different session with second service 1014 and identifies the session to both the UCSM and second service 1014 when the entities communicate (e.g., when second service 1014 pings or queries the UCSM for status 1040 corresponding to the session and second hash 1024).

This different session corresponding to Bob 1006 further includes a second timestamp 1034 under timestamp 1030, shown as 12:30 on ½. Second timestamp 1034 further identifies a creation time of the session to provide additional information to Bob 1006. In contrast to the first session and first status 1042, a second status 1044 for the session corresponding to Bob 1006 appears as "Active," indicating that the second session is still active with second service 1014. Bob 1006 may have requested that the session was terminated with second service 1014 directly, such as by logging out of the corresponding service provider account. However, second service 1014 may have failed to properly end the session, such as by invalidating a corresponding session ID, token, or cookie at the system or server for second service 1014. In this regard, a second action 1054 populates under action 1050 and allows Bob 1006 to "Terminate" this session with second service 1014. Second action 1054 may therefore correspond to a selectable interface element or option that allows Bob 1006 to request that the UCSM update second status 1044 with a termination request or status for use when second service 1014 pings the UCSM for second status 1044. By selecting second action 1054 and requesting the termination of the session, second status 1044 and second action 1054 may update to "Terminated" or "Inactive." Thereafter, when second service 1014 contacts or pings the UCSM through additional periodic or continuous API calls, the UCSM may respond to with the terminated status and/or a request to terminate, which may cause second service 1014 to invalid the session ID corresponding to second hash 1024, and therefore end the session. Additionally, in some embodiments, mappings 1000 may further include additional information, such as confidence scores in service 1010 in ending sessions so that users may view active steps and/or notifications required to end sessions.

Further in mappings 1000 shown through user interface 200a, a third session is shown for Bob 1008, where the third session may be a session with a third service 1016 corresponding to "websiteB.com." Third service 1016 may correspond to another online service provider that Bob 1008 has previously logged in with, but also has logged out and attempted to terminate their session. A third hash 1026 may be shown for a hashes session ID for the third session, which uniquely identifies the third session to third service 1016 and the UCSM. A third timestamp 1036 shows a time of 1:00 on ½ when the third session was established. However, as Bob 1008 knows that he has attempted to log out and end the third session, thereby invalidating the session ID corresponding to third hash 1026 with third service 1016, Bob 1008 may utilize user interface 200a to confirm termination of the third session.

For example, Bob 1008 may request that a third status 1046 is changed to terminated so that the third session is terminated by the UCSM. The UCSM may update mapping 1000 with a "Terminated" status shown in user interface 200a. However, the UCSM may not receive a confirmation of the termination of the third session. Thus, third status 1046 reflects that the session has not been terminated. Using user interface 200a with mappings 1000, Bob 1008 may then be provided third action 1056 shown as "Status Query." By selecting third action 1056, the user may request a status of the session from the UCSM and/or service provider, as well as display any confirmation for session termination from the UCSM. This allows the user to determine whether the session has been properly ended and the corresponding session ID invalidated or deleted.

Figure 2B:
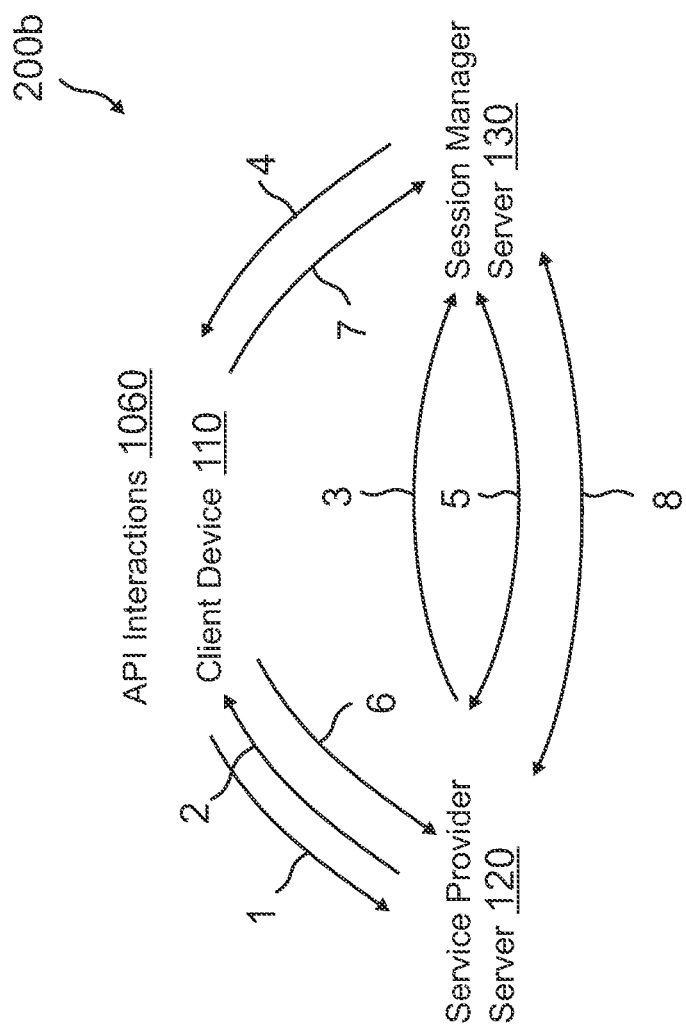
FIG. 2B are exemplary interactions and API calls between different online platforms and devices to provide a user-controlled session manager, according to an embodiment.

FIG. 2B are exemplary interactions 200b and API calls between different online platforms and devices to provide a user-controlled session manager, according to an embodiment. Interactions 200b include API interactions 1060 shown between different computing devices, services, and systems, such as user device 110, service provider server 120, and session manager server 130 discussed in reference to system 100 of FIG. 1.

In a first interaction 1 of API interactions 1060, user device 110 initiates a session with service provider server 120, such as by logging into an account and/or establishing a use session to exchange data and/or messages. For example, a user of user device 110 may initiate a contact and communications with service provider server 120 to utilize a service or other product from service provider server 120. Thereafter, service provider server 120 responds to user device 110 at second interaction 2 to establish the session and communicate with user device 110. This may include generating a session ID, token, or cookie that uniquely identifies the session and allows for transmitting messages through an abstraction layer. Further, during second interaction 2, a local cookie or other data may be stored to user device 110, such as by placing a session cookie on a web browser for user device 110.

When utilizing a UCSM for session management by the user corresponding to user device 110, a third interaction 3 of API interactions 1060 may be initiated. Third interaction 3 corresponds to an API call or write request from service provider server 120 to session manager server 130 that provides, establishes, and stores a hash of the session ID with a UCSM user account for the user with session manager server 130. For example, prior to third interaction 3, service provider server 120 may create a hashed session ID for the session ID, which may be generated through a hashing algorithm and/or function of service provider server 120. Thereafter, using an exposed API of session manager server 130 and a UCSM user identifier for the user's UCSM account with session manager server 130, service provider server 120 may provide the hashed session ID (as well as the UCSM account identifier as necessary) to session manager server 130 for storage with and presentation through the user's UCSM account. In some embodiments, the hashed session ID may be accompanied by a session status, such as active; however, this may also be inferred when a new hashed session ID is received. Session manager server 130 may then generate a mapping of the hashed session ID, service provider server 120, and the session status within the user's UCSM account.

At fourth interaction 4 of API interactions 1060, session manager server 130 may alert or notify user device 110 of the establishment of the session, request approval of the session, and/or provide a user interface with the user of user device 110 so that the user may view the mappings within the user's UCSM account. User device 110 may therefore be utilized to access the account through one or more user interfaces and determine a status of a particular session through the account mappings for sessions. At fifth interaction 5, service provider server 120 may continuously or periodically (e.g., every minute or five minutes) ping or query session manager server 130 for a status of the session, for example, using the user's UCSM user identifier and the hashed session ID. If the session remains active with session manager server 130, service provider server 120 may take no action with the session and may maintain the session and corresponding session ID. This may occur through additional API calls from service provider server 120 to session manager server 130, such as read calls for the session status from session manager server 130.

However, at sixth interaction 6, user device 110 may request or end the session with service provider server 120. However, service provider server 120 may not end the session at sixth interaction 6, such as if service provider server 120 encounters an error, does not receive the request, or does not adhere to session management security and protocol. Thus, the user may be unaware that the session ID is still active with service provider server 120. The user may view the mappings of the session's status with session manager server 130 through user device 110. Thus, at seventh interaction 7, the user may utilize user device 110 to view that the session is still active. The user may request that the session is terminated through an interface option presented with the UCSM's session mappings, for example, when the session is still shown as active. Thereafter, session manager server 130 may update the session status to terminated, ended, or inactive so that at eighth interaction 8, the session is ended. Eighth interaction 8 may occur through service provider server 120 again pinging or querying session manager server 130 for a status of the session through an API call, where session manager server 130 provides the termination status and/or request. This indicates that service provider server 120 should terminate the session and delete or render inactive the session token to prevent session hijacking. When changing the status to "terminated," "inactive," or another identification that the session should be ended, session manager server 130 may also determine whether a confirmation of session termination has been received. For example, session manager server 130 may receive another API call from service provider server 120 after updating the session status to terminated, where the API call indicates that service provider server 120 has ended the session and inactivated or deleted the corresponding session ID. In other embodiments, session manager server 130 may also initiate the API call to terminate the session as well as query service provider server 120 for confirmation of session termination.

Figure 3:
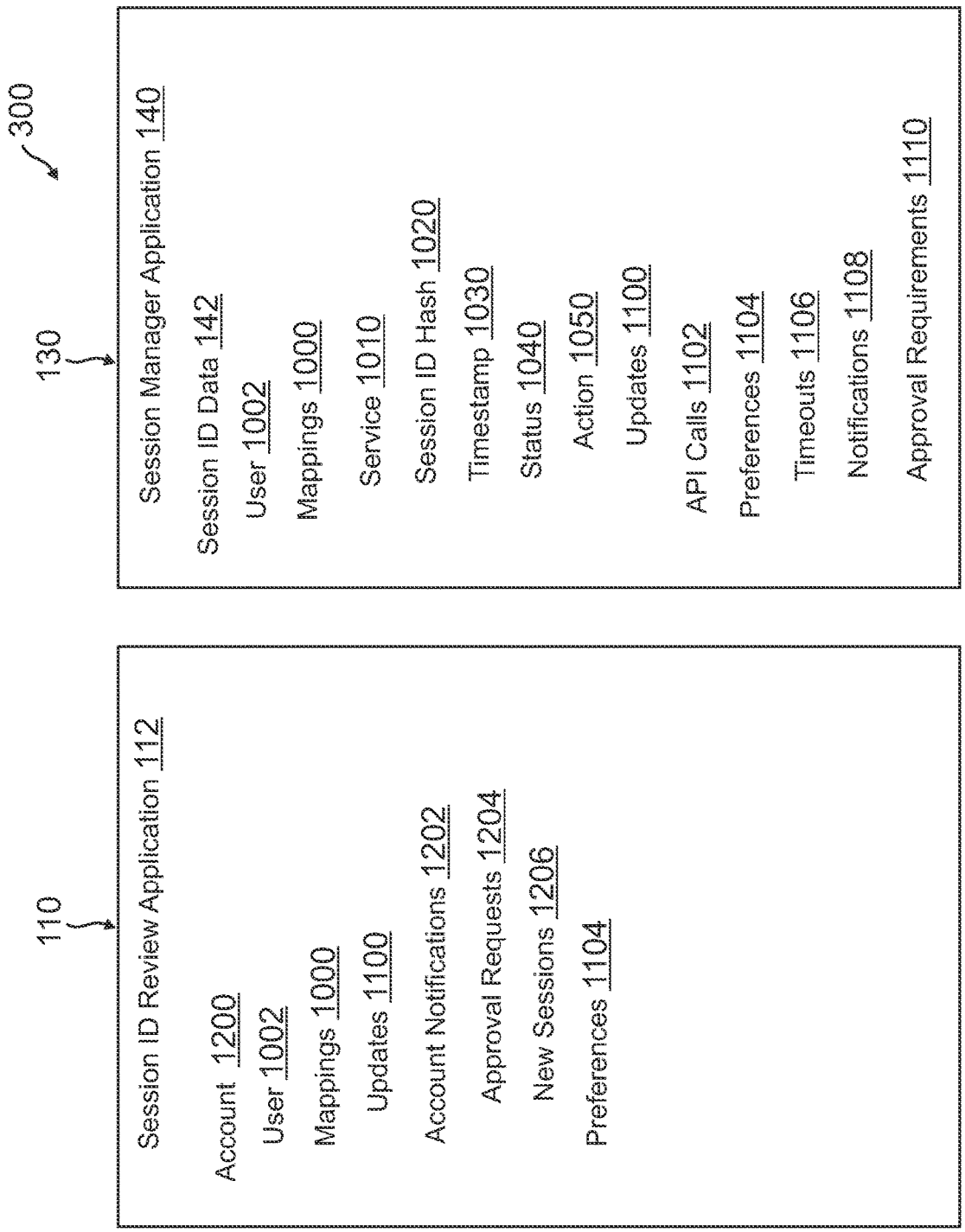
FIG. 3 is an exemplary system environment where a session manager server may interact with a service provider and a user device to control login, communication, and/or use sessions, according to an embodiment.

FIG. 3 is an exemplary system environment 300 where a session manager server may interact with a service provider and a user device to control login, communication, and/or use sessions, according to an embodiment. Environment 300 includes client and a session manager server 130 from system 100 of FIG. 1.

In this regard, environment 300 includes data stored and provided by each device, server, and/or system during management of sessions between a user and a service provider, such as service provider server 120. User device 110 may previously establish a session with the service provider through network communications, such as by logging in to an account and/or otherwise utilizing the service provider. Thereafter, session manager application 140 of session manager server 130 may receive session ID data 142 for the user and user device 110, which includes information for a hashed session ID and a session status for a session with a service provider. Session ID data 142 may identify user 1002, for example, from mappings 1000 displayed through user interface 200a in FIG. 2A. User 1002 is associated with mappings 1000 such that mappings 1000 includes service 1010, session ID hash 1020 for each session and corresponding session ID, timestamp 1030, and status 1040 having actions 1050 that may be taken to update or change status 1040. The data shown for mappings 1000 for user 1002 and their corresponding account may be received from the service provider and/or determined by session manager application 140 when session ID hash 1020 is received. Further, user 1002 may be associated with an account identifier for user 1002, which may be received with session ID hash 1020.

Further, session manager application 140 may receive, manage, and respond to API calls 1102 by providing data to user device 110 and/or the service provider. For example, API calls 1102 may correspond to one or more write calls for session ID hash 1020 or further pings and read requests for data corresponding to status 1040, such as whether a particular session is still noted as active with session manager application 140. API calls 1102 may be received periodically or continuously from the service provider so that the service provider may determine whether to end a session and render a session ID as inactive. User 1002 may also establish preferences 1104 that may be utilized to automate actions to take with regard to a particular session, including timeouts 1106 where a timeout may occur when a session is active for a time period (e.g., over 2 hours) or becomes active at certain times (e.g., 2:00 AM). Notifications 1108 may be used to send notifications to user device 110 based on established sessions, which may include approval requirements 1110 to approve a session when the session is established.

User device 110 may be used to view and control sessions through session ID data 142 through session ID review application 112. Thus, session ID review application 112 may be used to display and utilize data for account 1200 corresponding to user 1002. Account 1200 corresponds to the UCSM account of the user that may be utilized to manage and control sessions, such as by terminating sessions and requesting invalidation of the corresponding session ID. Thus, account 1200 may be used to view mappings 1000, as well as enter updates 1100 that may be used to change status 1040 for a particular session (e.g., to terminate the session). Further, account 1200 through session ID review application 112 may be used to view and interact with account notifications 1202, including approval requests 1204 to approve a session or terminate an unapproved session, as well as view any new sessions 1206 that have recently been established. Further, preferences 1104 may be established, updated, and changed through account 1200.

Figure 4:
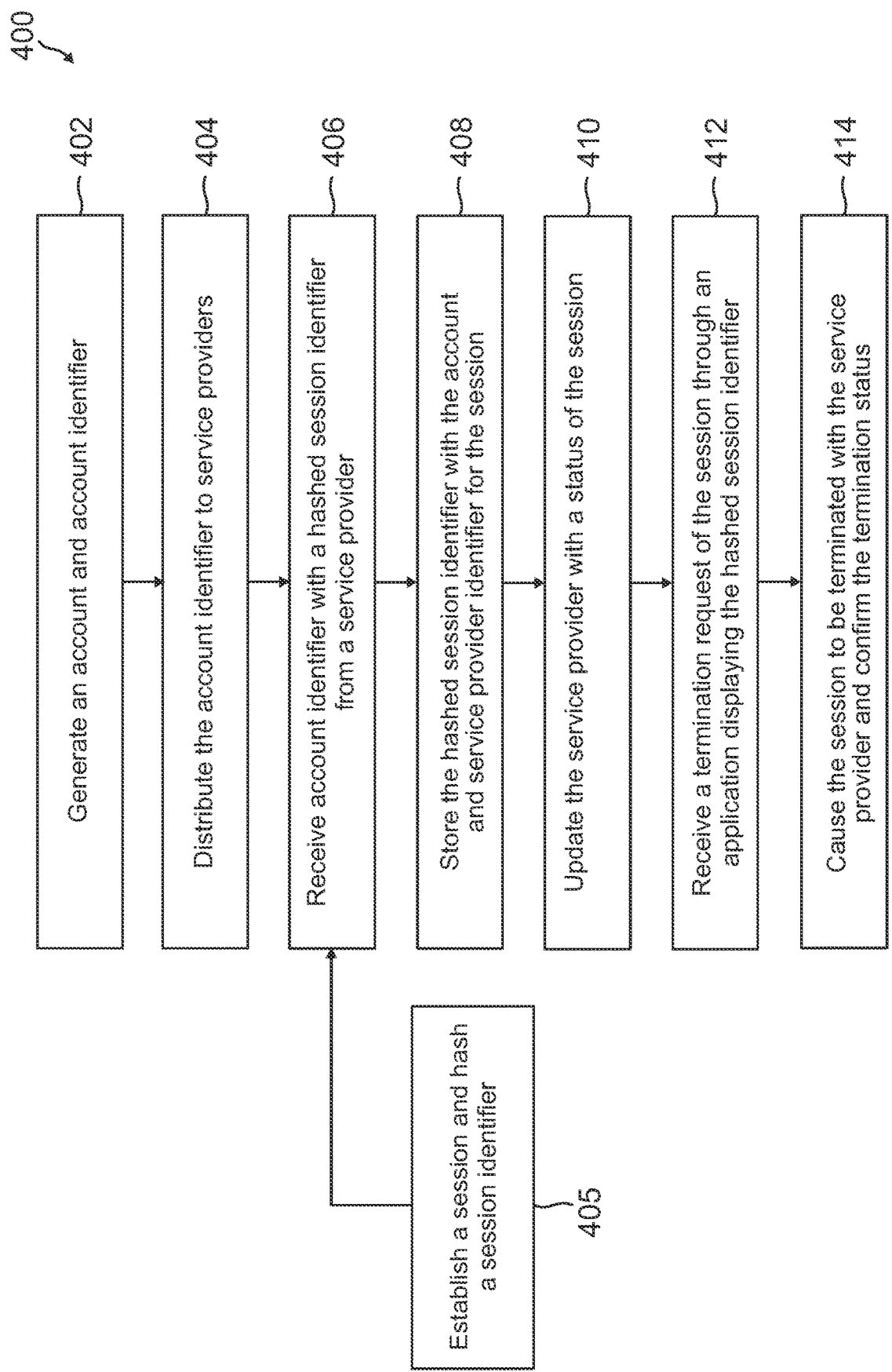
FIG. 4 is a flowchart of an exemplary process for a user-controlled session manager to provide remote disabling of session tokens, according to an embodiment.

FIG. 4 is a flowchart 400 of an exemplary process for a user-controlled session manager to provide remote disabling of session tokens, according to an embodiment. Note that one or more steps, processes, and methods described herein of flowchart 400 may be omitted, performed in a different sequence, or combined as desired or appropriate.

At step 402 of flowchart 400, an account and account identifier are generated for a UCSM account that allows controlling and terminating of sessions and session IDs through a centralized user-controlled account. This user-controlled account provides session management through an online server and/or system for a UCSM, which may interact with online service providers to change session statuses and provide indicators that sessions should be terminated in response to querying by the service provider. Thus, in order to link each service provider to the UCSM and the particular user to allow for user-controlled session management, the account identifier is required to be established and, at step 404, distributed to service providers. Distribution of the account identifier may be done by providing the account identifier to the user (e.g., via the account and/or account interfaces accessible through a website or application). The user may then provide the account identifier to service providers when the user enrolls with the service providers, logs in to an account, or otherwise creates a session with the service providers. In further embodiments, the UCSM may also provide or distribute the account identifier on behalf of the user, such as when the user designates certain service providers to receive the account identifier.

Thereafter, the user may then create and initiate sessions between different service providers. This may therefore require that a session is established by a service provider, at step 405, and a hash of a session identifier is established and/or generated by the service provider. Subsequent to the hashed session identifier being established for the session, at step 406, the account identifier is received by the UCSM with the hashed session identifier from the service provider. The account identifier may be used by the service provider to uniquely identify the user's UCSM account, and thus the user associated with the session, to the UCSM and allow the hashed session ID to be stored with the user's UCSM account. Thus, at step 408, the hashed session identifier is stored with the account and a service provider identifier for the session. This may correspond to generating and/or providing a mapping of this data so that a user may identify a session with a service manager, as well as the session's status.

The mapping and/or data for the session that is stored with the user's UCSM account may then be provided to the user to allow the user to view and/or end sessions. The UCSM then updates the service provider with a status of the session, at step 410. For example, the UCSM may receive pings and additional API calls to request a status of the session from the UCSM using the account identifier and the hashed session ID. The UCSM may respond to the service provider that the session is still active if the session status has not been changed. However, at step 412, a termination request of the session is received through an application displaying the hashed session identifier. This may correspond to the user using a user interface associated with their UCSM account to select an option and/or request that the session be terminated, and the session status be changed to inactive. Once the session is terminated, the UCSM may update a record of the session to inactive or terminated with the hashed session ID of the session. Further, at step 414, when an additional ping or API call is received from the service provider, the UCSM may cause the session to be terminated with the service provider by responding to the service provider that the session status indicates termination and/or allowing a read call of the session status being inactive or terminated. Thus, the UCSM may respond to a read call of the session status for the hashed session identifier that the status is now inactive, and the session should be terminated so that the session ID deleted or rendered inactive.

Further, the UCSM may request and/or receive a session termination confirmation, such as when the service provider further pings the UCSM after session termination. This may be received by the UCSM after the UCSM updates the session status to inactive or terminated, as well as responds to a ping for the terminated session status or allows a read call by the service provider of the terminated session status. Where the session has been confirmed to be terminated, the UCSM may further show the confirmation of termination via a user interface that displays the hashed session ID, service provider, and other session information. However, if the session has not been confirmed to be terminated, the UCSM may display an unconfirmed termination status, which may allow the user to further request termination of the session with the service provider and/or have the UCSM query the service provider for session status (including having the UCSM further request session termination using the hashed session ID).

Figure 5:
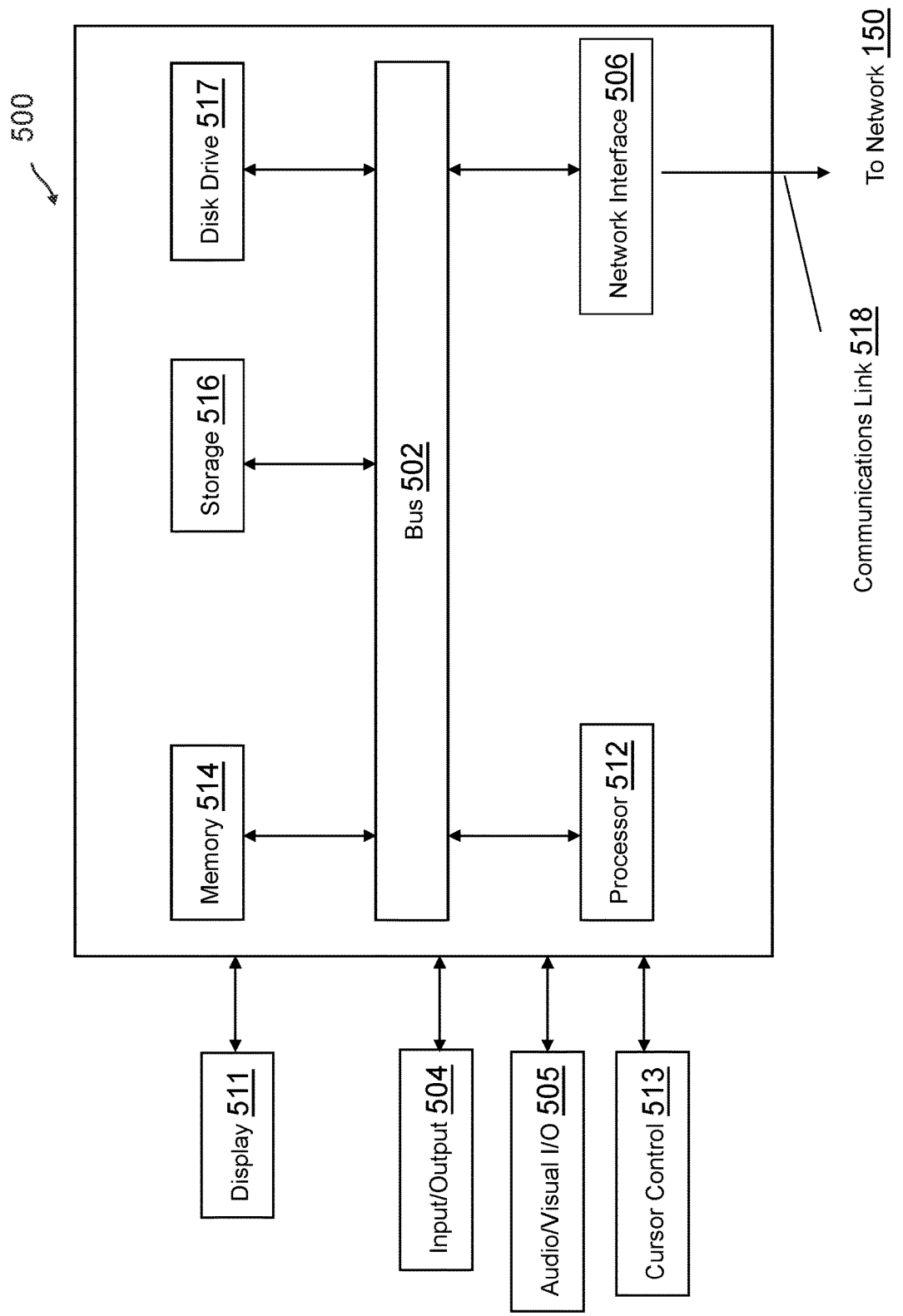
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the session manager system to perform operations comprising:
receiving, from a first application or website provider, a first session identifier and a first account identifier, wherein the first session identifier corresponds to a first session between the first application or website provider and a user and the first account identifier corresponds to a session manager account of the user;
identifying the session manager account for the user based on the first account identifier;
creating, for the session manager account, a first entry corresponding to the first session, wherein first entry comprises the first session identifier, a session status of the first session, and a first deactivation user interface element;
detecting, by a selection of the first deactivation user interface element via the session manager account, a request to end the first session;
in response to the detecting the selection of the first deactivation user interface element, updating, in the first entry, the session status of the first session to an inactive session status; and
causing the first application or website provider to terminate the first session.

2. The system of claim 1, wherein the session manager account includes a second entry corresponding to a second session, wherein the second session corresponds to a second application or website provider, and wherein the second entry includes a second session identifier, a session status of the second session, and a second deactivation user interface element.

3. The system of claim 1, the operations further comprising:
receiving a status request from the first application or website provider corresponding to the first session associated with the first entry,
and wherein the causing the first application or website provider to terminate the first session is based on providing information in response to the status request corresponding to the session status of the first session being updated to the inactive session status.

4. The system of claim 1, wherein the causing the first application or website provider to terminate the first session includes transmitting a message to the first application or website provider that indicates that the status of the first session is the inactive session status.

5. The system of claim 1, the operations further comprising:
receiving, from the first application or website provider, a confirmation that the first session has been terminated; and
updating an interface corresponding to the first entry to indicate that the first session has been terminated.

6. The system of claim 1, the operations further comprising:
determining that the first session has remained in an active session status for a first period of time; and
in response to the determining that the first session has remained in the active session status for the first period of time, providing a notification to the user indicating that the first session is in the active session status.

7. The system of claim 6, wherein the providing the notification to the user indicating that the first session is in the active session status includes determining if a confidence score associated with the first application or service provider is below a threshold score, wherein the confidence score is determined based on historical information corresponding to a timely termination of active sessions.

8. A method comprising:
receiving, from a first application or website provider, a first session identifier and a first account identifier, wherein the first session identifier corresponds to a first session between the first application or website provider and a user and the first account identifier corresponds to a session manager account of the user;
identifying the session manager account for the user based on the first account identifier;
creating, in the session manager account, a first entry corresponding to the first session, wherein first entry comprises the first session identifier, a session status of the first session, and a first deactivation user interface element;
detecting, a selection of the first deactivation user interface element via the session manager account, a request to end the first session;
updating, in the first entry, the session status of the first session to an inactive session status based on the request; and causing the first application or website provider to terminate the first session.

9. The method of claim 8, wherein the session manager account includes a second entry corresponding to a second session, wherein the second session corresponds to a second application or website provider, and wherein the second entry includes a second session identifier, a session status of the second session, and a second deactivation user interface element.

10. The method of claim 8, further comprising:
receiving a status request from the first application or website provider corresponding to the first session associated with the first entry,
and wherein the causing the first application or website provider to terminate the first session is based on providing information in response to the status request corresponding to the session status of the first session being updated to the inactive session status.

11. The method of claim 8, wherein the causing the first application or website provider to terminate the first session includes transmitting a message to the first application or website provider that indicates that the status of the first session is the inactive session status.

12. The method of claim 8, further comprising:
receiving, from the first application or website provider, a confirmation that the first session has been terminated; and
updating an interface corresponding to the first entry to indicate that the first session has been terminated.

13. The method of claim 8, further comprising:
determining that the first session has remained in an active session status for a first period of time; and
in response to the determining that the first session has remained in the active session status for the first period of time, providing a notification to the user indicating that the first session is in the active session status.

14. The method of claim 13, wherein the providing the notification to the user indicating that the first session is in the active session status includes determining if a confidence score associated with the first application or service provider is below a threshold score, wherein the confidence score is determined based on historical information corresponding to a timely termination of active sessions.

15. A non-transitory machine-readable medium having stored thereon machine-readable instructions executable to cause a machine to perform operations comprising:
receiving, from a first application or website provider, a first session identifier and a first account identifier, wherein the first session identifier corresponds to a first session between the first application or website provider and a user and the first account identifier corresponds to a session manager account of the user;
identifying the session manager account for the user based on the first account identifier;
creating, in the session manager account, a first entry corresponding to the first session, wherein first entry comprises the first session identifier, a session status of the first session, and an element status of a first deactivation user interface element;
detecting, via the element status indicating a selection of the first deactivation user interface element in the session manager account, a request to end the first session;
updating, in the first entry, the session status of the first session to an inactive session status based on the request; and
causing the first application or website provider to terminate the first session.

16. The non-transitory machine-readable medium of claim 15, wherein the session manager account includes a second entry corresponding to a second session, wherein the second session corresponds to a second application or website provider, and wherein the second entry includes a second session identifier, a session status of the second session, and a second deactivation user interface element.

17. The non-transitory machine-readable medium of claim 15, the operations further comprising:
receiving a status request from the first application or website provider corresponding to the first session associated with the first entry,
and wherein the causing the first application or website provider to terminate the first session is based on providing information in response to the status request corresponding to the session status of the first session being updated to the inactive session status.

18. The non-transitory machine-readable medium of claim 15, wherein the causing the first application or website provider to terminate the first session includes transmitting a message to the first application or website provider that indicates that the status of the first session is the inactive session status.

19. The non-transitory machine-readable medium of claim 15, the operations further comprising:
receiving, from the first application or website provider, a confirmation that the first session has been terminated; and
updating an interface corresponding to the first entry to indicate that the first session has been terminated.

20. The non-transitory machine-readable medium of claim 15, the operations further comprising:
determining that the first session has remained in an active session status for a first period of time; and
in response to the determining that the first session has remained in the active session status for the first period of time, providing a notification to the user indicating that the first session is in the active session status.

* * * * *